(12) United States Patent
Rouleau et al.

(10) Patent No.: US 7,299,816 B2
(45) Date of Patent: Nov. 27, 2007

(54) INFLATION VALVE ASSEMBLY

(75) Inventors: James V. Rouleau, Hudson, WI (US); Ronald F. Bradford, Oakdale, MN (US)

(73) Assignee: Survival Engineering, Inc., Hudson, WI (US)

( * ) Notice: Subject to any disclaimer, the term of this patent is extended or adjusted under 35 U.S.C. 154(b) by 16 days.

(21) Appl. No.: 11/160,489

(22) Filed: Jun. 27, 2005

(65) Prior Publication Data

US 2006/0289061 A1    Dec. 28, 2006

(51) Int. Cl.
    *F16K 17/40*    (2006.01)

(52) U.S. Cl. .......................... 137/68.3; 222/5; 441/41; 441/93

(58) Field of Classification Search ............... 137/68.3, 137/223, 224; 222/5; 441/41, 93
    See application file for complete search history.

(56) References Cited

U.S. PATENT DOCUMENTS

| | | | |
|---|---|---|---|
| 4,549,870 A | 10/1985 | Wass | |
| 4,595,374 A | 6/1986 | Wass | |
| 4,959,034 A | 9/1990 | Wass | |
| 5,161,738 A | 11/1992 | Wass | |
| 5,193,580 A | 3/1993 | Wass et al. | |
| 5,197,671 A | 3/1993 | Wass et al. | |
| 5,197,710 A | 3/1993 | Wass et al. | |
| 5,341,844 A | 8/1994 | Wass et al. | |
| 5,458,151 A | 10/1995 | Wass | |
| 5,495,865 A | 3/1996 | Wass et al. | |
| 5,647,390 A | 7/1997 | Wass | |
| 5,741,022 A | 4/1998 | Wass et al. | |
| 5,860,669 A | 1/1999 | Wass et al. | |
| 5,971,016 A | 10/1999 | Wass et al. | |
| 6,007,049 A | 12/1999 | Wass et al. | |
| 6,009,895 A | 1/2000 | Wass et al. | |
| 6,036,169 A | 3/2000 | Wass | |
| 6,071,084 A | 6/2000 | Wass et al. | |
| 6,260,570 B1 | 7/2001 | Wass et al. | |
| 6,260,571 B1 * | 7/2001 | Lind et al. | 137/68.3 |
| D470,570 S | 2/2003 | Wass | |
| 6,951,493 B1 * | 10/2005 | Lu | 441/93 |
| 2003/0047215 A1 | 3/2003 | Drewelow et al. | |
| 2003/0056823 A1 | 3/2003 | Wass et al. | |
| 2003/0066559 A1 | 4/2003 | Wass | |
| 2003/0155008 A1 | 8/2003 | Wass et al. | |
| 2003/0159731 A1 | 8/2003 | Wass et al. | |

* cited by examiner

*Primary Examiner*—Ramesh Krishnamurthy

(57) ABSTRACT

An inflation valve includes a main valve body having an outlet port, a rupture port, and a pull cord retainer. A puncture retainer body secures a puncture disc within the main valve body to seal the outlet port to gas flow. A slot in the puncture retaining body permits gas flow to the outlet port. A puncture pin received within the puncture retaining body includes a center bore permitting gas flow to the outlet port. A rupture disc breaks under high pressure conditions to permit pressurized gas to exit the rupture port. The rupture disc and puncture disc are interchangeable. A release assembly associated with the pull cord retainer permits manual release of the puncture pin. A vacuum washer is sealed between a vacuum retainer and the pull cord retainer to prevent gas from exiting the pull cord retainer when the inflation valve is activated under vacuum.

1 Claim, 2 Drawing Sheets

INFLATION VALVE ASSEMBLY

BACKGROUND OF THE INVENTION

The present invention relates to inflation equipment for inflatable devices. More particularly, the present invention is directed to an inflation valve of a puncture disc design for use with inflatable devices such as life rafts and the like.

Inflatable devices are commonly used for a wide variety of applications. For instance, inflatable devices include life rafts and life vests used as emergency floatation devices. Such inflatable devices provide the advantage of allowing small storage space while simultaneously being adapted to inflate quickly when use is desired. Inflation valves are commonly used on these inflatable devices, allowing a user to manually trigger the inflation valve, to inflate the device. Known valves typically contain a large number of parts, which create the potential for undesirable mistakes in the assembly process. For example, puncture valves and rupture valves can mistakenly be reversed, potentially resulting in either one of the discs operating improperly.

Additionally, certain inflatable devices may be subject to a vacuum environment. Conventional inflation valves are typically not designed to operate under vacuum conditions, and are not properly sealed to prevent leakage of compressed gas prior to or during inflation.

Lastly, conventional devices also suffer from restricted fluid flow paths for passage of gas through the inflation valve once the valve is activated for inflation. These restricted passages for fluid flow result in an inefficient transfer of compressed gas from the inflation valve to the inflation device.

It is therefore a principal object of this invention to provide an inflation valve having more efficient flow passages for gas transfer.

A still further object of this invention is to provide an inflation valve having interchangeable rupture and puncture discs.

A still further object of this invention is to provide an inflation valve operable under vacuum conditions.

These and other objects will be apparent to those skilled in the art.

SUMMARY OF THE INVENTION

An inflation valve includes a main valve body having an outlet port, a rupture port, and a pull cord retainer. A puncture retainer body secures a puncture disc within the main valve body to seal the outlet port to gas flow. A side slot opening in the puncture retaining body permits gas flow to the outlet port. A puncture pin received within the puncture retaining body includes a center bore permitting gas flow to the outlet port. A rupture disc breaks under high pressure conditions to permit pressurized gas to exit the rupture port. The rupture disc and puncture disc are interchangeable. A release assembly associated with the pull cord retainer permits manual release of the puncture pin. A vacuum washer is sealed between a vacuum retainer and the pull cord retainer to prevent gas from exiting the pull cord retainer when the inflation valve is activated under vacuum.

DESCRIPTION OF THE PREFERRED EMBODIMENTS

Figure 1:
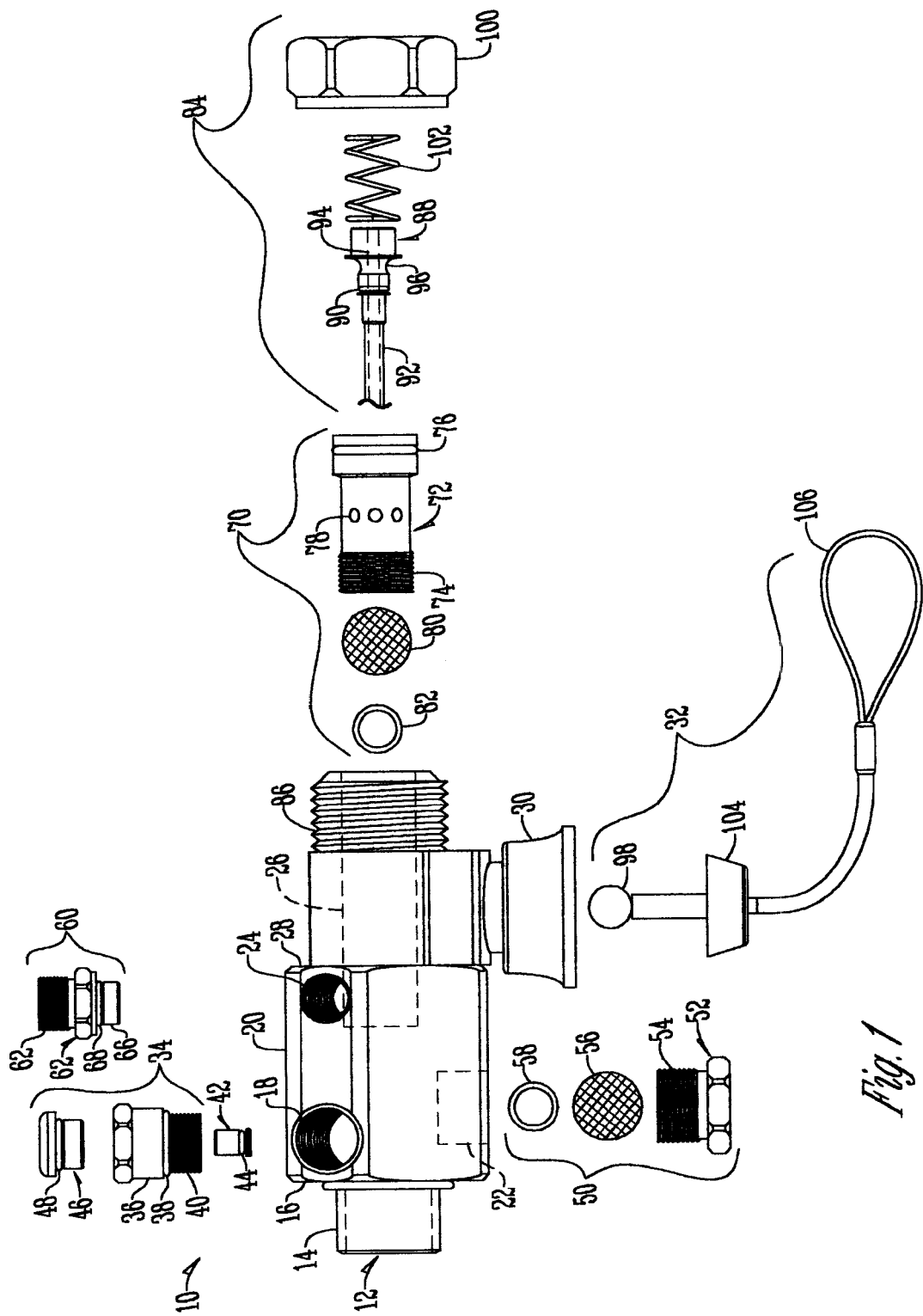
FIG. 1 is an exploded side elevation view of one embodiment of an inflation valve of the present invention.

Referring to FIG. 1, inflation valve 10 provides an actuating mechanism for selectively inflating inflatable devices (not shown), such as inflatable life rafts and the like. The inflation valve 10 includes a main valve body 12 having an inlet 14 in a first end 16 of the main valve body 12. The inlet 14 is operatively associated with a pressurized source of gas (not shown) for inflating inflatable devices. A charge receptor port 18 is located in a side 20 of the main valve body 12. The charge receptor port 18 is adapted to receive a charge of pressurized gas into the inflation valve 10 for later release when inflation is activated. A rupture port 22 is located in an opposite side 20 of the main valve body 12. The rupture port 22 is adapted to permit pressurized gas to exit the inflation valve 10 in conditions where the pressure in the inflation valve 10 unexpectedly spikes to a dangerous level. An outlet port 24 is located in side 20 of the main valve body 12. The outlet port 24 is adapted to permit pressurized gas to exit the inflation valve 10 when the inflation valve 10 is activated. A puncture port 26 is located on a second end 28 of the main valve body 12. The puncture port 26 is adapted to receive a mechanism for selectively opening the inflation valve 10 to gas flow from the inlet 14 to the outlet port 24. A pull cord retainer 30 is located adjacent the second end 28 of the main valve body 12 next to the puncture port 26. The pull cord retainer 30 is adapted to receive a release assembly 32 allowing a user to activate the inflation valve 10.

A charge receptor assembly 34 is fastened to the charge receptor port 18, and includes a charge receptor body 36 having a seal ring 38 and a threaded fastening portion 40 thereon adapted to threadably seal the charge receptor body 36 to the charge receptor port 18. A poppet valve 42 having a seal ring 44 is secured between the charge receptor body 36 and the charge receptor port 18. The poppet valve 42 is adapted to selectively permit pressurized gas to flow through the charge receptor body 36 into the charge receptor port 18 while preventing backflow of pressurized gas from the charge receptor port 18 into the charge receptor body 36. A charge receptor cap 46 including a seal ring 48 is sealed to the charge receptor body 36 and is positioned to be exterior to the main valve body 12. The charge receptor cap 42 is adapted to connect the charge receptor body 36 to a pressurized gas charging device (not shown).

A rupture assembly 50 is releasably engaged to the rupture port 22. The rupture assembly 50 is adapted to permit gas to exit the rupture assembly 50 when an unexpected spike in pressure is experienced by the inflation valve 10. The rupture assembly 50 includes a rupture retainer body 52 having a threaded fastening portion 54 thereon for releasably engaging the rupture port 22. A rupture disc 56 is held within the rupture port 22 by the rupture retaining body 52. The rupture disc 56 is adapted to break under dangerously high pressure conditions to permit pressurized gas to exit the rupture retaining body 52. A seal ring 58 is captured between the rupture disc 56 and the rupture port 22 to prevent leakage of pressurized gas around the rupture disc 56.

An outlet assembly 60 is removably engaged to the outlet port 24 The outlet assembly 60 is adapted to permit gas flow from the inflation valve 10 to an inflatable device (not shown) when the inflation valve 10 is activated. The outlet assembly includes an outlet body 62 having a threaded fastening portion 64 on one end adapted to releasably secure the outlet body 62 to the outlet port 24. An outlet cap 66 including a seal ring 68 is located on the opposite end of the outlet body 62 from the threaded fastening portion 64. The outlet cap 66 is adapted to connect the outlet body 62 to an inflatable device (not shown).

A puncture assembly 70 is releasably engaged to the puncture port 26 at the second end 28 of the main valve body 12. The puncture assembly 70 is adapted to prevent gas flow to the outlet port 24 until the inflation valve 10 is activated. The puncture assembly 70 includes a puncture retainer body 72 having a threaded fastening portion 74 on one end adapted to releasably secure the puncture retainer body 72 within the puncture port 26 of the main valve body 12. A seal ring 76 is located on the opposite end of the puncture retainer body 72 from the threaded fastening portion 74. The seal ring 76 is adapted to prevent pressurized gas flow around the outside of the puncture retaining body 72. A slot 78 (or a plurality of slots) is located in the puncture retaining body 72 between the threaded fastening portion 74 and the seal ring 76. The slot 78 is adapted to permit gas flow out a side of the puncture retaining body 72 once the inflation valve 10 is activated. A puncture disc 80 is retained within the puncture port 26 by the puncture retaining body 72. The puncture disc 80 is adapted to prevent gas flow until broken during inflation valve 10 activation. The rupture disc 56 and puncture disc 80 are of interchangeable design. A seal ring 82 is located between the puncture disc 80 and the puncture port 26 to prevent leakage of pressurized gas prior to activation of the inflation valve 10 and the breaking of the puncture disc 80.

A pin assembly 84 is releasably associated with a threaded fastening portion 86 on the main valve body 12 at the puncture port 26. The pin assembly 84 is adapted to break the puncture disc 80 when the inflation valve 10 is activated. The pin assembly 84 includes a puncture pin 88 received within the puncture retainer body 72 and includes a seal ring 90 thereon to seal the puncture pin 88 to the puncture retaining body 72. A pin head 92 extends toward the puncture disc 80. The pin head 92 is adapted to break the puncture disc 80 when the inflation valve 10 is activated. A center bore 94 extends through the pin head 92 of puncture pin 88 to permit a path for gas flow through the center bore 94 and exiting to the outlet port 24 once the inflation valve 10 has been activated. A receiving groove 96 is located on the puncture pin 88. The receiving groove 96 operates in conjunction with the release assembly 22 to receive a release ball 98 of the release assembly 22 locking the pin assembly 84 in a pre-activation position until the release assembly 32 is pulled by a user to activate the inflation valve 10. A pin retention cap 100 is removably fastened to the threaded fastening portion 86 of the main valve body 12 to secure the puncture pin 88 with in the puncture retaining body 72. A biasing element 102 is secured between the pin retention cap 100 and the puncture pin 88 to provide a positive bias force on the puncture pin 88. The positive bias force of the bias element 102 is released when the release assembly 22 is pulled away from the receiving groove 96 on the puncture pin 88.

The release assembly 32 is retained by the pull cord retainer 30 of the main valve body 12 adjacent the puncture pin 88. The release assembly 32 is adapted to permit a user to manually activate the inflation valve 10 by releasing the puncture pin 88 to break the puncture disc 80 and permit gas to flow out the outlet port 24. The release assembly 32 includes a seal portion 104 associated with the pull cord retainer 30 on the main valve body 12 to prevent gas flow out of the pull cord retainer 30. The release ball 98 extends from the seal portion 104 and is contained within the main valve body 12. The release ball 98 is adapted to engage the receiving groove 98 on the puncture pin 88 to hold the puncture pin 88 in a non-activated position until a user manually activates the release assembly 32. A pull cord 106 extends from the seal portion 104 to the exterior of the main valve body 12. The pull cord 106 is adapted to permit a user to manually activate the inflation valve 10 by disengaging the release ball 98 from the receiving groove 96 on the puncture pin 88, thus releasing the bias element 102 and forcing the pin head 92 of the puncture pin 88 through the puncture disc 80.

Figure 2:
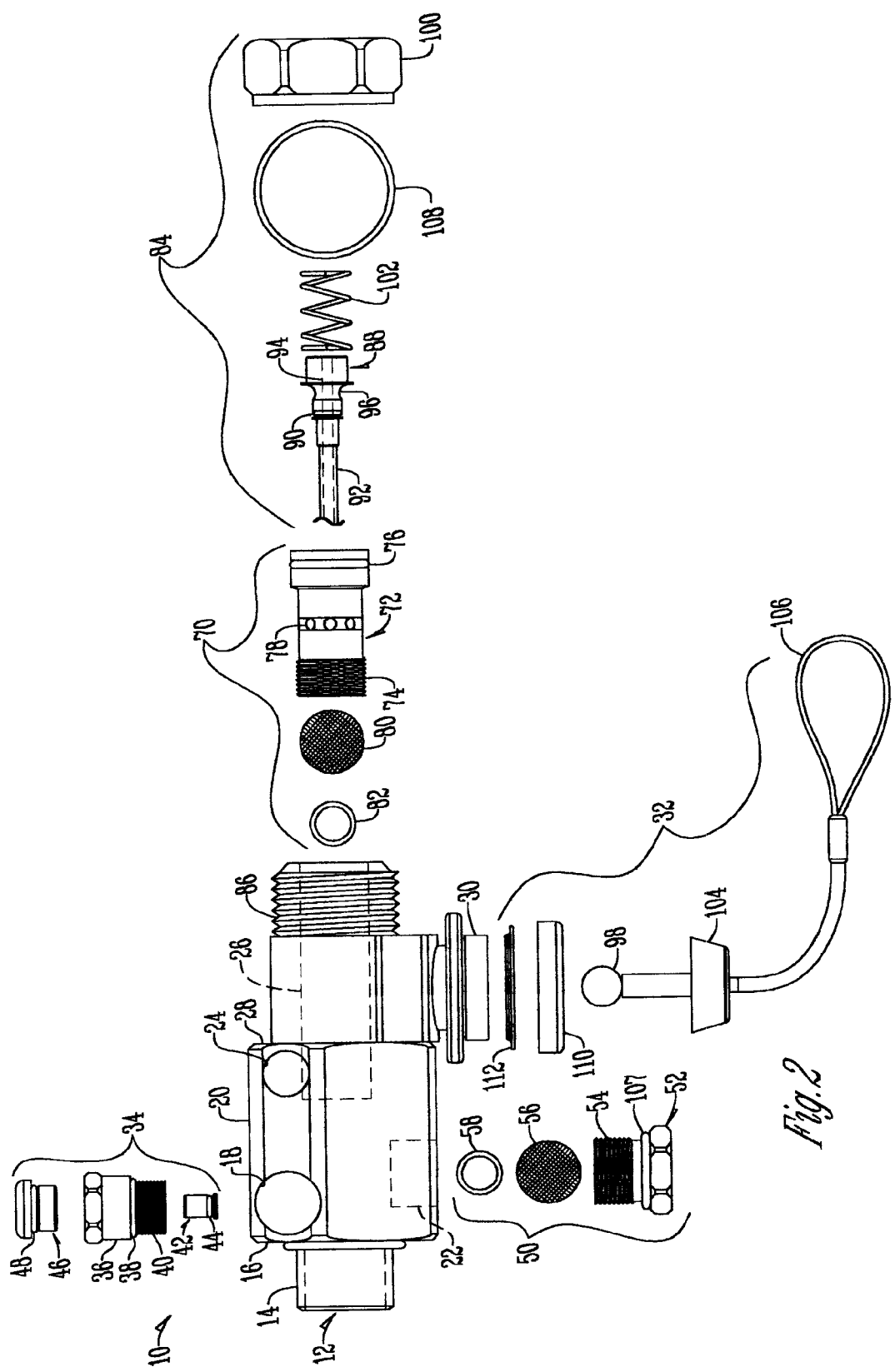
FIG. 2 is an exploded side elevational view of a second embodiment of an inflation valve of the present invention.

In another embodiment, multiple outlet ports 24, 24' may be located in the side 20 of main valve body 12. (FIG. 2). The rupture assembly 50 includes an additional seal ring 107 on the rupture retainer body 52 to prevent leakage of gas under vacuum from the rupture port 22. An additional seal ring 108 is also located between the pin retention cap 100 and the threaded fastening portion 86 of the main valve body 12. The seal ring 108 is adapted to prevent gas from exiting around the pin retention cap 100 when the inflation valve 10 is activated under vacuum.

The release valve assembly 32 of FIG. 2 includes a vacuum retainer 110 secured over the seal portion 104 to secure the seal portion 104 to the pull cord retainer 30 of the main valve body 12. A vacuum washer 112 is sealed between the vacuum retainer 110 and the pull cord retainer 30. The vacuum retainer 110 and vacuum washer 112 are adapted to prevent gas from exiting the pull cord retainer 30 of the main valve body 12 when the inflation valve 10 is activated under vacuum. The rupture assembly includes an additional seal ring on the rupture retainer body to prevent leakage of gas under vacuum.

It is therefore seen that the present invention will achieve at least all of its stated objectives.

What is claimed is:

1. An inflation valve, comprising:
    a main valve body having an outlet port;
    a puncture disc operatively associated with the outlet port to seal the outlet port to gas flow;
    a puncture pin adapted to break the puncture disc when the inflation valve is activated;
    a pull cord retainer on the main valve body, the pull cord retainer adapted to receive a release assembly;
    the release assembly adapted to permit a user to manually activate the inflation valve by releasing the puncture pin to break the puncture disc, the release assembly comprising:
    a vacuum retainer, and
    a vacuum washer sealed between the vacuum retainer and the pull cord retainer, wherein the vacuum retainer and vacuum washer are adapted to prevent gas from exiting the pull cord retainer of the main valve body when the inflation valve is activated under vacuum;
    wherein the vacuum retainer is secured over a seal portion of the release assembly to secure the seal portion to the pull cord retainer.

* * * * *